United States Patent
Caruk et al.

(10) Patent No.: US 7,480,808 B2
(45) Date of Patent: Jan. 20, 2009

(54) METHOD AND APPARATUS FOR MANAGING POWER CONSUMPTION RELATING TO A DIFFERENTIAL SERIAL COMMUNICATION LINK

(75) Inventors: Gordon F. Caruk, Brampton (CA); Carrell R. Killebrew, Jr., Saratoga, CA (US)

(73) Assignee: ATI Technologies ULC, Markham, Ontario (CA)

( * ) Notice: Subject to any disclaimer, the term of this patent is extended or adjusted under 35 U.S.C. 154(b) by 773 days.

(21) Appl. No.: 10/893,641

(22) Filed: Jul. 16, 2004

(65) Prior Publication Data

US 2006/0023633 A1 Feb. 2, 2006

(51) Int. Cl.
G06F 1/26 (2006.01)
(52) U.S. Cl. .................. 713/300; 713/320; 713/323
(58) Field of Classification Search ........... 713/300, 713/323
See application file for complete search history.

(56) References Cited

U.S. PATENT DOCUMENTS

| | | | |
|---|---|---|---|
| 6,363,023 B2 * | 3/2002 | Andersen et al. ........... 365/207 |
| 6,560,240 B1 | 5/2003 | Borland et al. | |
| 6,760,349 B1 * | 7/2004 | Ho et al. ................... 370/537 |
| 7,136,953 B1 * | 11/2006 | Bisson et al. ............. 710/307 |
| 7,188,263 B1 * | 3/2007 | Rubinstein et al. ......... 713/300 |
| 7,200,186 B2 * | 4/2007 | Schoenborn ............... 375/316 |
| 7,203,853 B2 * | 4/2007 | Martwick et al. .......... 713/320 |
| 2002/0085415 A1 * | 7/2002 | Baltar .................. 365/185.09 |
| 2005/0078712 A1 * | 4/2005 | Voutilainen ............... 370/516 |
| 2005/0238055 A1 * | 10/2005 | Frodsham et al. .......... 370/474 |

OTHER PUBLICATIONS

Bhatt, Ajay V.; Creating a Third Generation I/O Interconnect; Desktop Architecture Labs, Intel Corporation; from www.express-lane.org; pp. 1-11.

* cited by examiner

Primary Examiner—Nitin C Patel
(74) Attorney, Agent, or Firm—Vedder Price P.C.

(57) ABSTRACT

Briefly, a method, apparatus and system for managing power corresponding to a differential serial communication link that has a link width defined for example by one or more lanes wherein the lanes are adapted to communicate clock recovery information in a data stream, determines, during normal operating conditions, such as conditions other than power on, reset or link fault conditions, a desired link width for the serial communication link and then changes the link width accordingly.

20 Claims, 6 Drawing Sheets

METHOD AND APPARATUS FOR MANAGING POWER CONSUMPTION RELATING TO A DIFFERENTIAL SERIAL COMMUNICATION LINK

FIELD OF THE INVENTION

The invention relates generally to methods and apparatus for reducing power consumption for differential serial communication circuits, and more particularly to methods and apparatus for reducing power consumption corresponding to differential serial communication links that communicate clock recovery information in a data stream.

BACKGROUND OF THE INVENTION

Reducing power consumption of integrated circuits and systems continues to be a difficult but necessary task particularly for integrated circuits used in mobile devices such as laptop devices, handheld devices and other mobile and non-mobile devices. In addition, reducing power consumption related to communication links can be critical since communication links may consume large amounts of power during active modes. One communication link proposed by the PCI SIG to augment and possibly replace several buses for high performance interconnect is referred to as PCI Express™. This proposed link consists of one or more lanes, each lane being capable of bi-directional communication. A single lane is composed of two sets of differential serial communication pairs. A single differential serial communication pair is required for transmission of information in a single direction, thus two pairs provide for bidirectional transmission capability. Communication in this scheme is accomplished by means of the transmission of packets across lane(s). Each packet contains clock information and possibly data. In all cases clock information is transmitted in a continuous stream of packets in both directions within each bidirectional lane. The continuous transmission of packets with embedded clock information can consume significant amounts of power.

Each differential serial communication pair consists of for example two, low voltage, differentially driven pairs of signals: a transmit pair and a receive pair. Data is embedded in an encoding scheme and organized into packets to achieve high data rates. The bandwidth of the differential serial communication link may be linearly scaled by adding lanes. For example, an implementation may support x1, x2, x4, x8, x12, x16 and x32 lane widths and splits the data across the lanes as desired. During initialization (such as power-up), each PCI Express™ link is set up following negotiation of the link width and frequency of operation by two agents at each end of the link. No firmware or operating system needs to be used. The selection of the link width however is typically performed during a power on condition, a reset condition or link fault condition through the use of a link training and status state machine (LTSSM).

In addition, power savings is employed after the link width is defined during initialization, such that lower power may be used depending upon the power setting of the links. For example, during active link (e.g. normal) operation, a transmitter's power may be changed to multiple different power levels (which are designated L0, L1, etc.). As such, once the link width has been determined after initialization, the link width stays the same but different power states may be used. L0, which may be for example an 80 milliwatt mode per lane, L0s which may be for example a 20 milliwatt mode per lane, L1, which may be a 5 milliwatt mode per lane and L2 or L3 which may be a mode that may consume less than 1 milliwatt of power per lane. Depending upon the power state level, it may take more time for the links to become active or increase the power states depending upon the electrical circuitry that is shut off during these power modes. In all events however, the power modes are normal states within a set constant link width. This does not preclude additional desirable power savings.

For example, during normal operation the links that have been previously designated as active may change power states to save power by turning off for example the circuitry involved in the transmitting of communication on either side of the link. However, although this results in a power savings, the link width is kept the same until for example a system is turned off and powered up, reset or if there is a link failure. As such, additional power savings would be desirable.

FIG. 1 illustrates a state diagram illustrating, for example, the states of the link training and status state machine that is used during a power-up condition to initially negotiate the link width between two ends of the links. As noted above, this operation is performed during non-normal operating conditions (e.g. non-active link condition) such as during power on or if there is a link fault recovery requirement or if a reset occurs. The detect state is typically entered during the power on state or other non-active or normal states. During the detect state for example the state machine on one or both sides of the link detects the number of lanes that are connected.

During the detect state, a receiver detection sequence is performed to see how wide the link width can be. For example, data is communicated to determine the number of lanes available or the maximum number of lanes available on either side of the link. A polling state is used to send training sets to stabilize receivers. In the configuration state, a link width negotiation is performed to negotiate the number of lanes that are to be used. For example, if one end of the link can accommodate eight lanes but another end of a link can accommodate sixteen, the maximum link width would be eight lanes. In the L0 state, electrical idle conditions are used to, for example, enter different power states for lanes that have been selected as active during the configuration state. To come out of a power saving state (e.g., L1 to L0), a recovery state is entered which includes, for example, sending training set information between the elements at the ends of the link to retrain the link, and to re-enter L0.

Also, to initially determine the number of lanes or the link width during power on, reset or other inactive operation condition, the detect state and other states in the transitions between these states must be carried out. To change the link width, a recovery state is entered which transitions to a configuration state which then transitions to the detect state. Then training at the new link width commences. For example, it may take at least 64 microseconds or as long as 12 milliseconds to go from the detect state to the L0 state. In addition, as noted above the link width determination is only performed during non-active modes. Moreover, the link can become unstable because a link down state is entered so that accesses on the link are discarded.

Accordingly, a need exists for a method and apparatus to further reduce power consumption in connection with a differential serial communication link.

DETAILED DESCRIPTIONS OF THE DRAWINGS

The invention will be more readily understood in view of the following description when accompanied by the below figures and wherein like reference numerals represent like elements:

Figure 4:
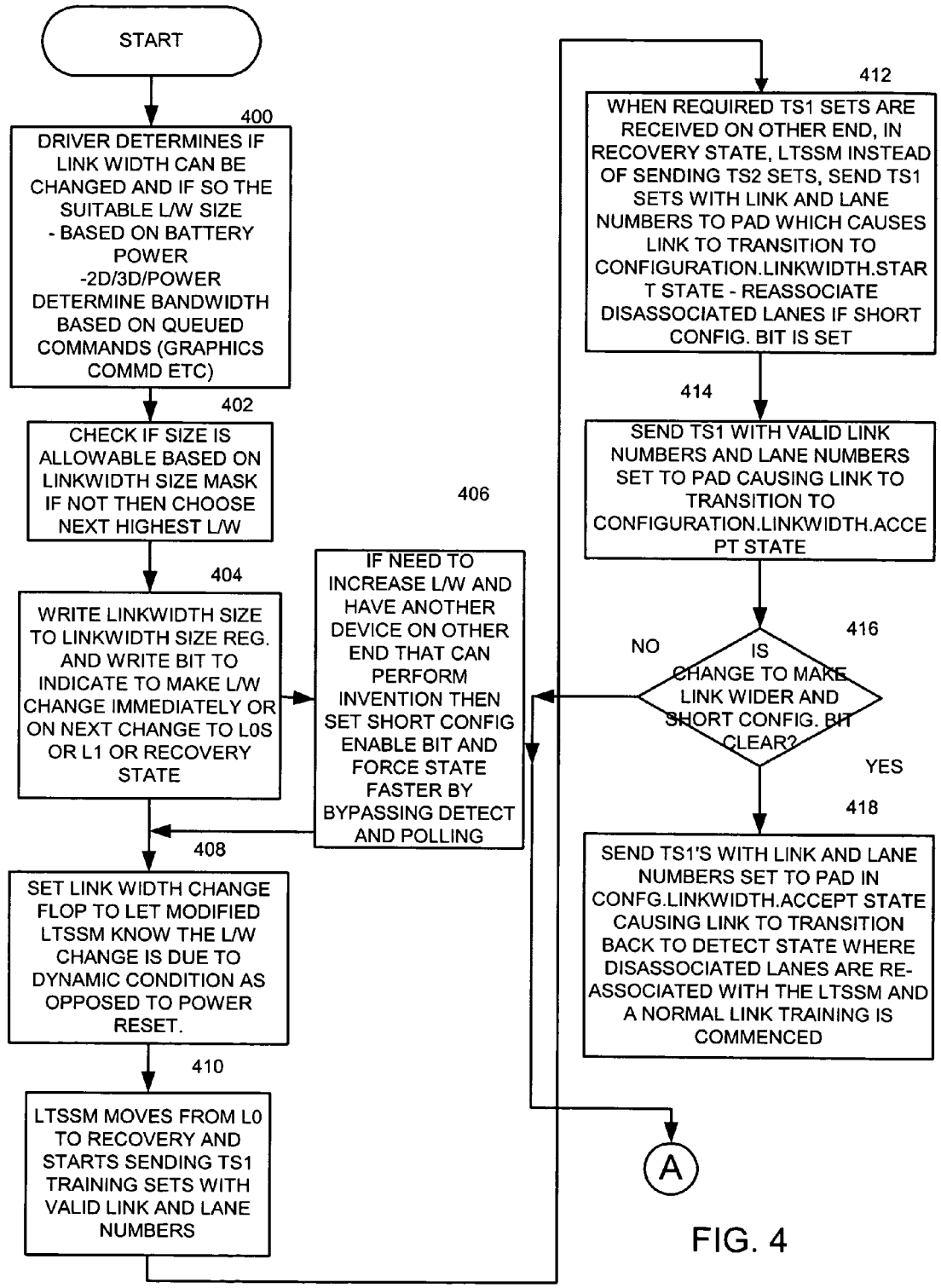
Figure 5:
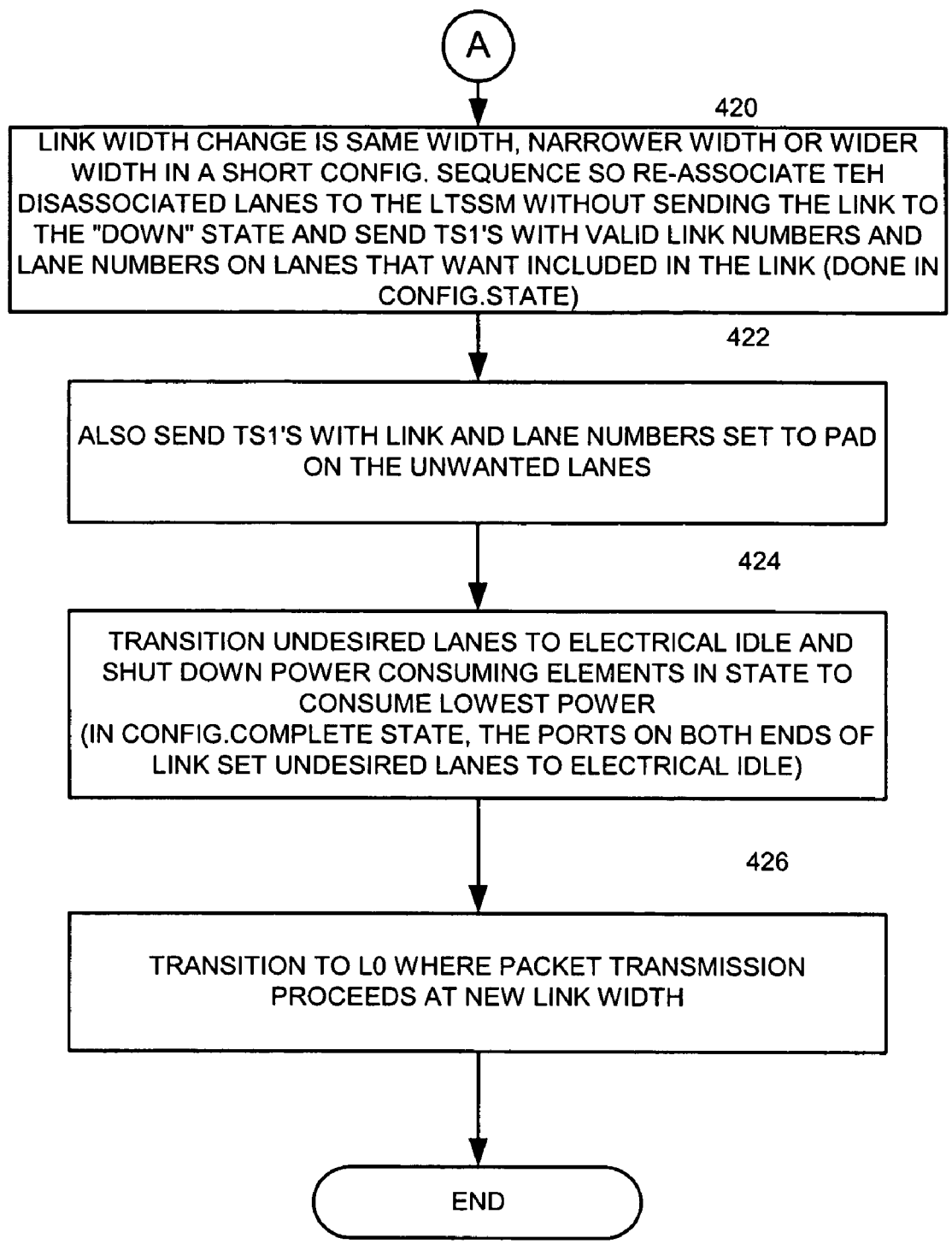
Figure 6:
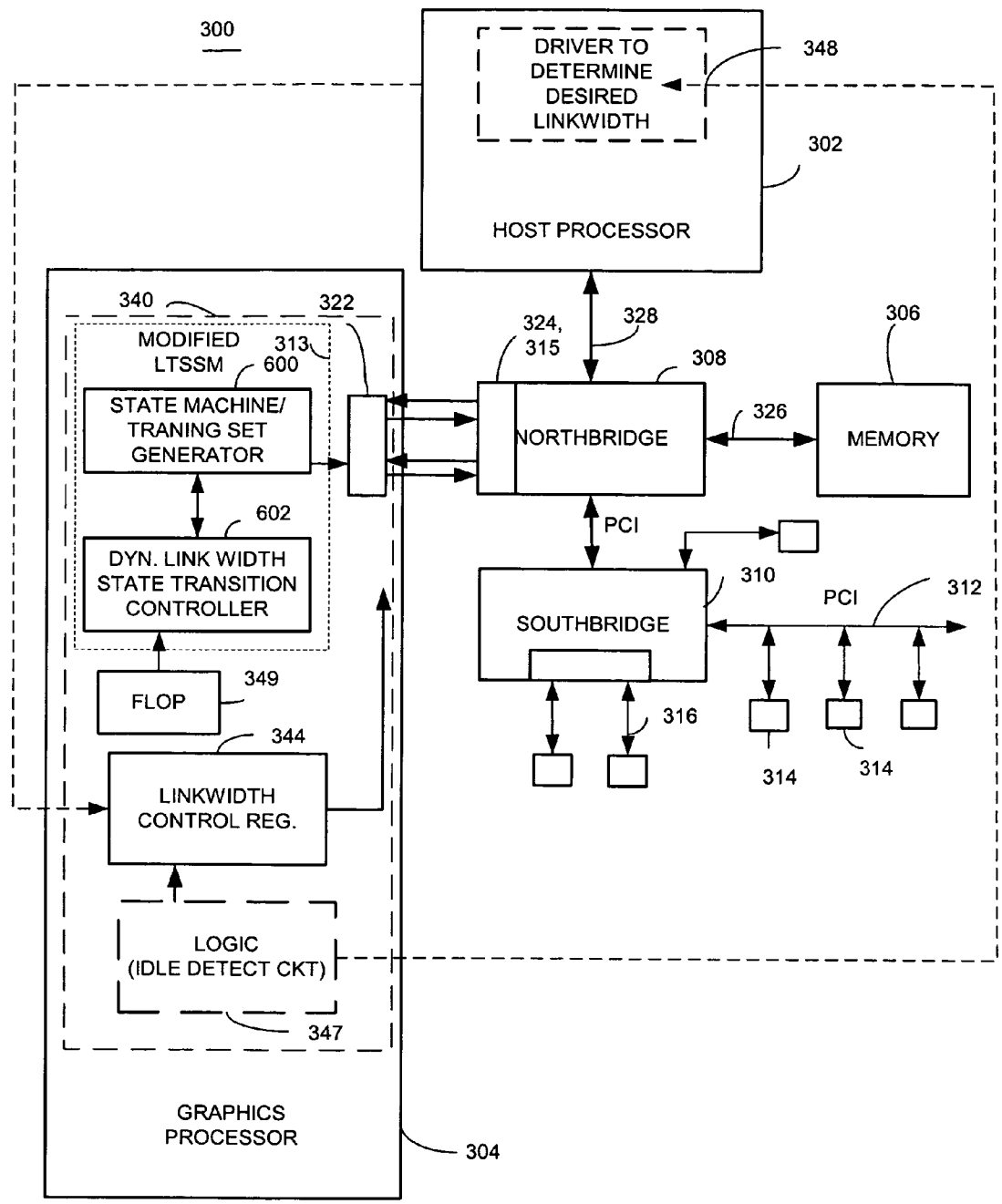

FIGS. 4-5 are flowcharts illustrating examples of a method for managing power corresponding to a differential serial communication link in accordance with one embodiment of the invention; and FIG. 6 is a block diagram illustrating one example of a system that employs circuits for managing power corresponding to a differential serial communication link in accordance with another embodiment of the invention.

DETAILED DESCRIPTION OF THE PREFERRED EMBODIMENT

Briefly, a method, apparatus and system for managing power corresponding to a differential serial communication link that has a link width defined, for example, as one or more lanes wherein the lanes are adapted to communicate clock recovery information in a data stream, determines, during normal operating conditions, such as conditions other than power on, reset or link fault conditions, a desired link width for the serial communication link. This is done on a dynamic basis during normal operation of the links. The current link communication demand is determined on a periodic basis. The method, apparatus and system also changes the number of active lanes of the differential serial communication link to change link width based on the determined desired link width such that each active lane operates in a normal operational state. As such, the number of lanes that are used during normal operation may be dynamically increased or decreased during normal operation thereby reducing power consumption.

In addition, the standard power saving states may also be used for the active lanes. For example, if it is determined that there is reduced demand for communicating information over the link, the number of lanes may be dynamically reduced thereby reducing the power consumption during normal operation. When the demand increases back to a level that requires the use of additional lanes, the system, method and apparatus may increase the link width to accommodate the increase in demand for link use. All lanes in a link are controlled together as one link. In a low level way, the lanes are independent, but from a higher level, all of the lanes associated with any given link are controlled as one entity.

In one embodiment, effectively an LTSSM is modified so that lane configuration processes are carried out during normal operating modes of the links, as opposed to only being initiated during power ons, reset conditions, link failures, or other non-normal operation conditions of the link. In one example, when the link width is to be increased, bypassing of a transition to the detect state is provided such that a transition to the link configuration state is initiated instead. This allows, for example, the reassociation of previously disassociated links without the requirement of sending specific training sets and without potentially losing or preventing a transmit data buffer from discarding stored data during the process of reassociating the disassociated lanes.

In one embodiment, an apparatus and system employs, for example, a differential serial communication circuit that is adapted to communicate clock recovery information in a data stream. In addition, dynamic link width control logic is operatively coupled to the differential serial communication circuit for managing power consumption corresponding to the differential serial communication circuit. The differential serial communication circuit may include, for example, the requisite differential drivers and other supporting logic to facilitate the communication of data to another differential receiver or to receive data from another differential transmitter. The dynamic link width control logic is operative to change, during normal operating conditions, the number of active lanes of the differential serial communication link to change the link width. This is based on a determined desired link width, such as determined through a driver executing on a host processor, or provided by link width determination logic located in a same integrated circuit, or from any other suitable source. In one embodiment, a link width command register and link width control register are employed to control the dynamic link width control logic to set the link to the proper width size and to do so at a proper time and to effect, for example, the bypassing of certain states normally initiated during a conventional reset or power on condition.

When increasing the number of lanes, by reassociating the lanes while the links are still "up", the link width change can happen at virtually any time even if there are requests in flight. Conventional mechanisms of recovery and replay can help ensure that accesses will not be lost.

The above methods, apparatus and system allows a determination to be made to change a link width to a more appropriate link width during normal operating conditions to reduce power consumption. A link width change sequence is initiated, and all lanes may be reassociated in a recovery state. The logic causes training sets with link and lane numbers set to PAD to be generated. PAD is defined as "filler" for those skilled in the art. When the process passes through a configuration state, the link width is negotiated to the determined value. When link training is complete the link returns to the L0 state at the new link width.

In one embodiment, a control register is used that serves as a bit mask that enables which link widths are allowed. This can prevent link width changes to link width sizes that have not been validated on a particular platform. The registered contents are programmed by, for example, a software driver or operating system after interrogating the components in the system. Among other advantages, the disclosed methods, apparatus and systems reduce a processing sequence for changing link widths of a differential serial communication link during normal operations of the link and provide additional power savings, and performs the link change while keeping the computer system stable.

Figure 1:
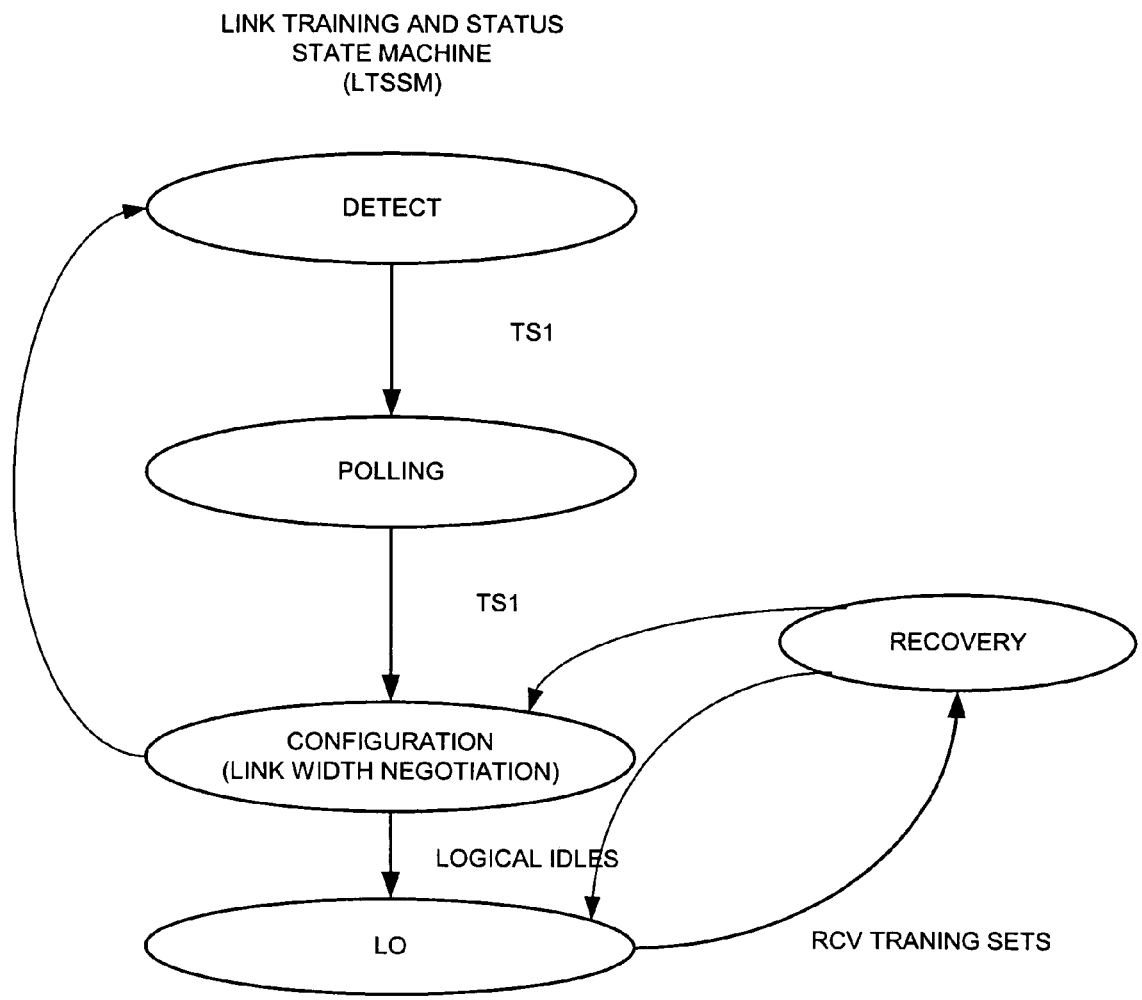
FIG. 1 is a diagram illustrating one example of a state diagram for a link training and status state machine in accordance with prior art.
Figure 2:
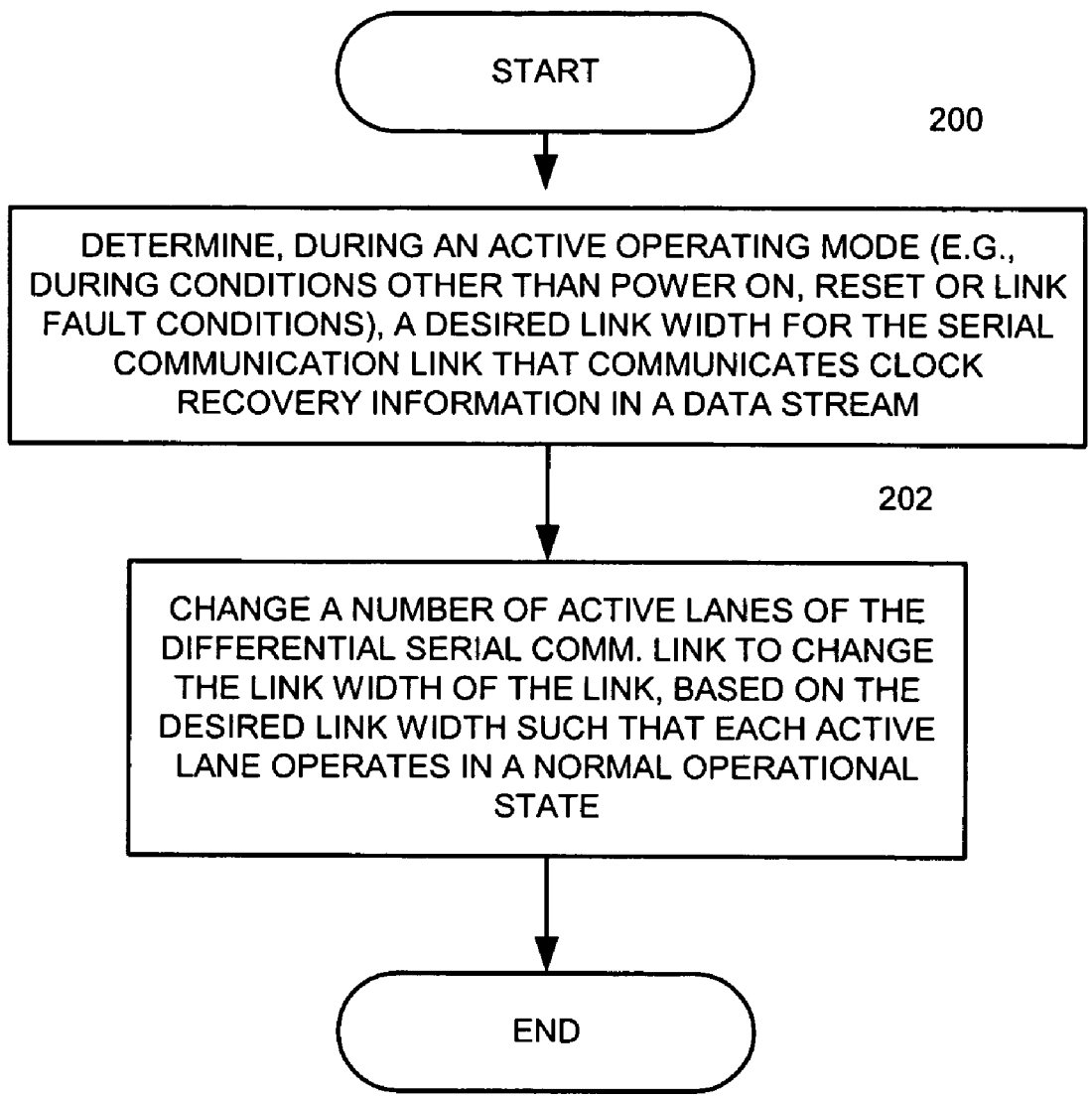
FIG. 2 is a flowchart illustrating one example of a method for managing power corresponding to a differential serial communication link in accordance with one embodiment of the invention.

FIG. 2 is a flowchart illustrating one example of a method for managing power consumption associated with, or corresponding to, a differential serial communication link. The communication link has a link width comprised of one or more lanes adapted to communicate clock recovery information in a data stream. As shown in block 200, the method includes determining, during an active operation mode of the link, such as during conditions other than power on, reset or link fault conditions, a desired link width for the serial communication link. By way of example, a host computer, other processor, graphics processor, or any other suitable element may determine based on, for example, link inactivity, link activity, whether a battery condition exists, or an estimate of the link bandwidth demand to determine, for example, the amount of data that needs to be communicated in a particular period of time or over a range of time on the differential serial communication link. Any suitable technique to determine the bandwidth requirements may be used. For example, where a graphics processor is communicating information over the differential serial communication link, it may be desirable to take into account whether a screen save mode is on, a 3D rendering engine is operational, a video capture engine is activated, or any other suitable condition that may require the communication or lack of data from, or to, the differential link. Depending upon the amount of determined bandwidth demand, the number of lanes can be adjusted to provide the requisite amount of bandwidth and can reduce the number to reduce power consumption.

As shown in block 202, once the desired link width is determined, the method includes changing a number of active lanes of the differential serial communication link to change the link width of the link. Changing the number of active lanes occurs such that each active lane that is changed operates in a normal operating state. The changing of the number of active lanes is performed during normal operation as opposed, for example, to only occurring during reset conditions, power on conditions or link corruption conditions.

Figure 3:
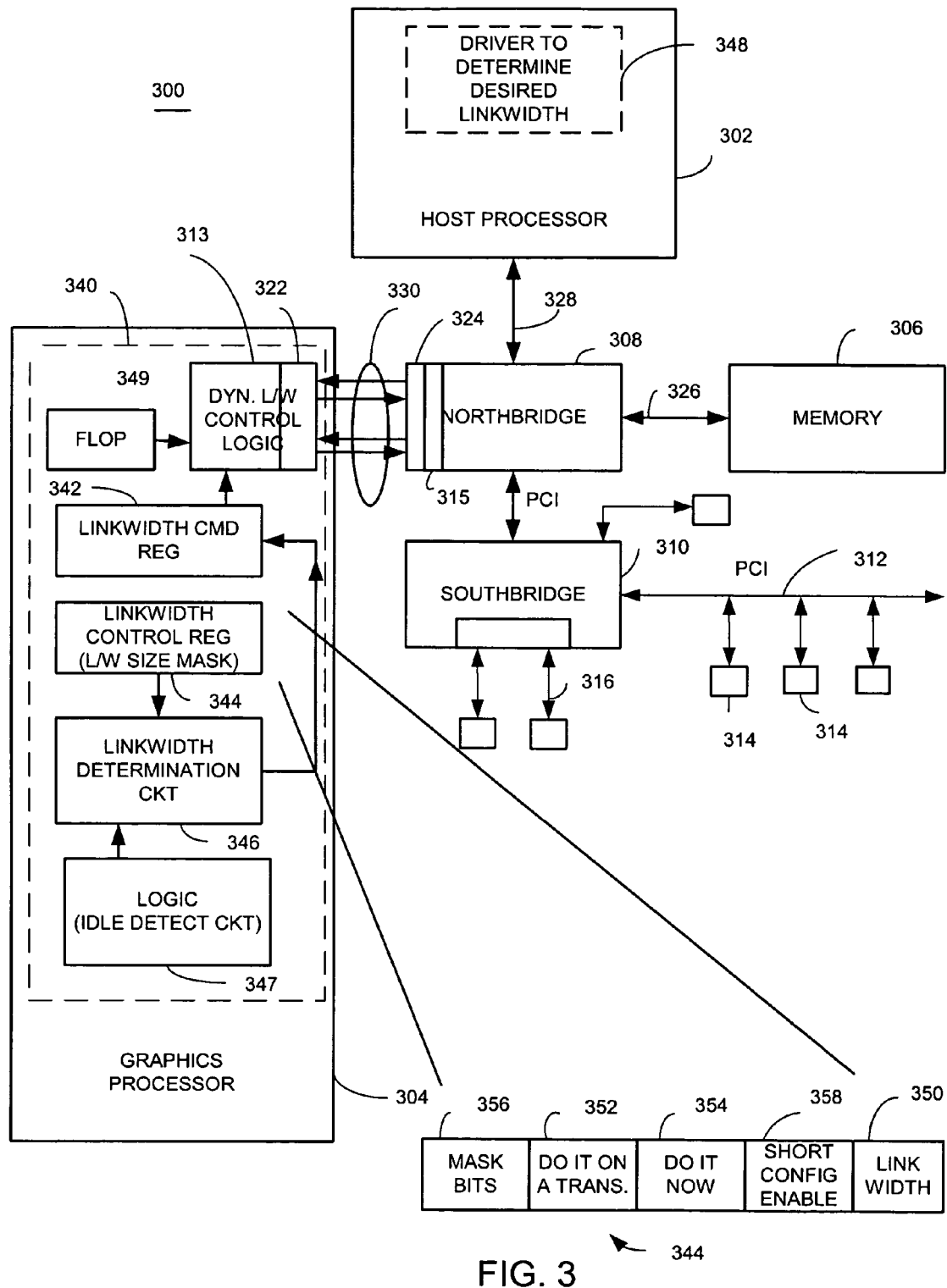
FIG. 3 is a block diagram of a system that includes circuits for managing power corresponding to a differential serial communication link in accordance with one embodiment of the invention.

FIG. 3 illustrates one example of a system 300 that may carry out the method shown in FIG. 2. The system 300 is merely one example of a suitable system and it will be recognized that any suitable apparatus or system may also carry out the operations and functions described herein. In this example, the system 300 is shown as a computing system which may be, for example, incorporated in a handheld device, laptop computer, desktop computer, server, or any other suitable device. The system 300 includes a host processor 302, a coprocessor such as a graphics processor 304, memory 306, a memory bridge circuit 308, such as a north bridge and another I/O bridge circuit 310. The host processor 302 may be for example any suitable processor including, but not limited to, an Intel type processor, the graphics processor may be any suitable graphics processor including, but not limited to, the type sold and manufactured by ATI Technologies Inc., Thornhill, Ontario, Canada. The north bridge 308, south bridge 310 and memory 306 may be any suitable circuits as known in the art. However, as described herein, the graphics processor 304 includes in this example, dynamic link width control logic 313 and the memory bridge circuit 308 also includes as counterpart dynamic link width control logic 315. As further noted below, in the "long" version of link width negotiation, a dynamic link width control circuit is required at one end of the link only. It will cause the component at the other end of the link to follow it through the negotiation process. The I/O bridge 310 may be suitably connected through a PCI bus 312 or any suitable bus to other peripheral components 314 and may be coupled to the north bridge through a PCI bus or any other suitable bus. In addition, the I/O bridge circuit 310 may also have a plurality of differential serial communication links 316 coupled to other peripheral devices. Other I/O devices 314 may also be coupled to the processor 302 through the I/O bridge 310.

The system 300 also includes a differential serial communication circuit 322 which includes, for example, the requisite differential transmit and receive drivers compliant, for example, with the PCI Express architecture, or any other suitable differential serial communication link. A corresponding differential serial communication circuit 324 is also located in the memory bridge circuit 308 in this example. However, it will be recognized that suitable element may employ a differential serial communication link.

The graphics processor 304 includes the differential serial communication circuit 322 in this example as part of an integrated circuit with other graphics processing circuitry. Other graphics processing circuitry is operatively coupled to the differential serial communication circuit through suitable circuitry and buses. Graphics processing circuitry may include, for example, 2D and 3D rendering engines, video capture engines and any other suitable operations as known in the art.

The memory bridge circuit 308 is in communication with the memory 306 through a suitable bus 326 and to the host processor 302 through a suitable bus 328 and communicates to the graphics processor 304 through at least the differential serial communication link 330.

In this example, the graphics processor includes a dynamic link width circuit 340 which includes, for example, the dynamic link width control logic 313, the differential serial communication circuit 322, a link width command register 342, a link width control register 344, and in this example a link width determination circuit 346. However, it will be recognized that the link width determination circuit 346 is shown as being implemented in hardware in this instance, and may also be implemented through a suitable software application executing on the host processor 302 which is shown by dashed lines 348. As such, the link determination circuit 346 may be implemented as a set of instructions that are stored in memory that are executed by a suitable processing device. It will be recognized that as described herein any logic or other suitable operations may be implemented in any suitable form including, but not limited to, any suitable combination of hardware, software and firmware. In addition, it will be recognized that the processors described herein may be any suitable device that processes digital data including, but not limited to, digital signal processors, central processing units, microcomputers, microprocessors, state machines or any other suitable combination of hardware, software and firmware. In addition, it will be recognized that although registers are described, they may be suitably be stored in the memory 306 or in host processor 302 or at any other suitable location and may be suitably accessible through any suitable bus configuration or any other configuration by the processor 304 or 308 as desired.

The graphics processor 304 also includes, in this example, logic 347 to, for example, detect a link idle condition. The circuit may be used, for example, to cause the dynamic link width control logic 312 to cause active links to be set in different power saving modes as known in the art. A circuit 349 such as a flip flop or any other suitable circuit is operatively coupled to the dynamic link width control logic 313 which is activated to cause the dynamic link width control logic 313 to transition to a configuration state instead of a detect state as described below. The dynamic link width control logic 313 in this example is a state machine however it may be implemented in any suitable manner.

The link width determination circuit 346 is operatively coupled to the dynamic link width control logic 313 via, for example, the link width command register 342 or through any suitable manner. The link width determination circuit 346 is operative to determine, during conditions other than power on, reset or link fault conditions, a desired link width for the serial communication link. As such, the link width determination circuit 346 dynamically determines, on a continuous basis for example, or periodically, or occasionally during normal device operation, the bandwidth requirements of the differential serial communication link 330. The link width determination circuit 346 may read the link width control register 344 and may also receive an indication as to whether the link is idle, is going to become idle, has been idle for some time or other suitable indication of an idle condition from the idle detect circuit 347. The link width determination circuit 346, in this embodiment, writes to the link width command register 342 to cause the dynamic link width control logic 313 to change the number of lanes and hence the link width of the differential serial communication link.

In particular, the link width command register 342 contains data that represents a command that causes the dynamic link width control logic 313 to change the link width to a size identified by a link width control register 344. The link width control register 344 in this example includes data representing a desired link width size 350 as determined, for example, by the link width determination circuit 346, data indicating whether to initiate a change in link width on a particular state transition as indicated by data 352, data representing whether to initiate the change in link width immediately as indicated by data 354, and data representing allowable link width size constraint such as link width mask bits indicated 356. The data 352 and 354 represents data indicating when to change the link width.

In addition, the link width control register 344 includes data indicating whether to initiate a shortened transition operation for instances where an increase in link width is required. This data is indicated as data 358. As such, when this indicates that this operation is enabled, the dynamic link width control logic 312 will reassociate lanes that were previously disassociated without causing the link to go "down" and hence bypasses the detect state normally entered when the number of lanes are increased, for example, during a power on or reset condition. For example, when changing the number of active lanes includes increasing the link width, the data 358 causes the dynamic link width control logic as set forth in the command provided by the link width command register, to reassociate one or more previously disassociated links without causing the link to go "down". Stated another way, the changing of the number of active lanes includes increasing a link width by bypassing a transition to a link detect state and instead continues in a link configuration state.

Referring also to FIGS. 4 and 5, these Figures illustrate in more detail a method for managing power consumption associated with a differential serial communication link as carried out for example by the system shown in FIG. 3. As shown in block 400, the method includes determining if the link width can be changed and if so, the suitable link width size. This may be done for example by the link width determination circuit 346 in the graphics processor or in the embodiment where this is implemented in software, by the host processor 302 in the form of, for example, a driver 348. The determination may be based on, for example, whether battery power is being used, whether 2D or 3D engines or any other suitable graphics processor engines are being employed, to determine the bandwidth or determine based on queued commands such as graphics processor commands in a command queue, or any other suitable technique for determining the bandwidth required for sending or receiving communication over the serial differential serial communication link 330 as defined by the differential serial communication circuits 322, 324. It will be recognized that the operation of the dynamic link width circuit 340 is described with reference to one side of the serial communication link. However, it will be recognized that the same circuit 340 (illustrated as block 315) may also be located on the other side of the link so that either side may detect the amount of bandwidth or serve as the master for initiating and performing the link width changes. As shown in block 402, the method includes determining if the desired link width size is allowable. For example, the CPU or graphics processor may determine allowable link width ranges of elements, such as peripheral devices or in this case the memory bridge element on both ends of the differential serial communication link and set the maximum link width size, for example, as a size mask and store the data representing the allowable link width size constraint. This data was previously referred to as data 356 shown in FIG. 3. For example, if there are sixteen lanes available on the memory bridge circuit, but only a maximum of eight lanes are available on the graphics processor side of the link, then the maximum allowable link width size is eight lanes in this case. If it is determined that the bandwidth requirements will exceed the eight lanes, other scheduling or other suitable communication techniques may be employed. If the allowable size is within the range indicated by the mask then the maximum size is selected. Otherwise the next highest link width is chosen.

As shown in block 402, the method includes writing the chosen link width size to the link width size register which, in this example, is shown as the data 350. In addition, the method includes setting other bits in the link width control register 344 such as indicating when to make the link width change. For example, the immediate enabled bit 354 indicates that the link width change should occur immediately or for example, setting bits 352 indicates to perform a link width change on the next L0S or L1 state or recovery state in this example. As shown in block 406, a determination is also made to determine whether an increase in link width is required from the current link width level. If so, the short configuration enable bit 358 may be set indicating to force a configuration state faster by bypassing a detect and polling transitions and performs the link width change without the link entering a link down condition and the system becoming unstable.

As shown in block 408, the method includes for example, activating the logic 349 such as setting a flop to indicate that a link width change is in progress. With this flop set, it causes the dynamic link width control logic 312 to transition from L0 to recovery.rcvrlock and to start sending training sets (TS1) with valid link and lane numbers. The flop lets the dynamic link control logic, also referred to as the modified LTSSM, to know that the link width change is due to a dynamic bandwidth determination condition as opposed to a power on or a reset or other non-normal operation condition. As such, the state machine is controlled to operate in a different manner than a conventional LTSSM. Once the required number of training sets are received by the receiving end, which may be done by the other end of the link indicating that it has gone to a recovery state, the dynamic link width control logic 312 transitions to recovery.rcvrcfg. This is shown in blocks 410 and 412. For example, in the recovery.rcvrcfg state, instead of sending another type of training set (TS2) the dynamic link width control logic 312 causes TS1 training sets with link and lane numbers set to PAD which causes the dynamic link width control logic 312 to transition to a state referred to as configuration.linkwidth.start. As shown in block 412, in this state which is a configuration state, the dynamic link width control logic 312 causes training sets (TS1s) with valid link numbers and lane numbers set to PAD to cause a link to transition to the state configuration.linkwidth.accept. As shown in block 416, the method includes determining whether the link width change that is to be made is an increase in the link width. This may be determined for example, by the link width determination circuit and identified for example, by the new link width size or link width size data 350 and a comparison can be made as to whether it is larger or smaller than the previous link width setting. If an increase in link width is to be performed, the method includes reassociating previous disassociated lanes without requiring a transition to a detect state thereby preventing a transmit data buffer from discarding stored data during a process of reassociating disassociated lanes when the short configuration sequence is enabled. As shown in block 418, if an increase in link width is to be performed, and the short configuration sequence is not enabled, the method includes sending training sets (TS1s) with link and lane numbers set to PAD in the configuration-.linkwidth.accept state. This transitions the link back to the detect state where the disassociated lanes are reassociated with the dynamic link width control logic states and a conventional link training operation is started.

Returning back to block 416, if the link change is to be the same width or a narrower width or a wider width in the short configuration sequence the methods proceeds as shown on block 420. A short width change sequence may be used compared to the number of states required during a non-normal operation. For example, the dynamic link width control logic 312, as shown in block 420 sends the TS1 training sets with valid link numbers and lane numbers on lanes that the dynamic link width control logic 312 wants included in the link. This is done for example in the configuration.linkwidth.accept state. The dynamic link width control logic 312 sends the training sets TS is with link and lane numbers set to PAD, on the lanes that the port does not want included in the link. This is shown in block 422. As shown in block 424, the method includes transitioning the undesired lanes to electrical idle and shutting down power consuming elements in a state to consume lowest power. For example, in the next state is the configuration.complete state wherein the dynamic link width control logic 312 at either end of the link transitions the undesired lanes to an electrical idle mode such as one of the power savings modes as known in the art. That way the undesired lanes will consume the lowest amount of power. The dynamic link width control logic 312 then causes the differential serial communication circuits to then transition to the L0 state where TLP (transaction layer packets) and other packet transmission can proceed at the new link width. This is shown in block 426. The method can then repeat as desired on a dynamic basis to change a link width when the link width determination circuit determines that the current link width is undesirable. As described above, the changing of the number of active lanes is provided by causing a link width negotiation sequence during normal device operation.

It will be recognized that by reassociating the disassociated lanes without having to go back to the detect state, a short change loop or reduced state sequence can be used to reduce a reconfiguration time down to perhaps two microseconds. This is preferably done before the state machine enters the configuration state. The preferred state to do this is in the recovery.rcvrcfg state.

When increasing the number of lanes, the method described above reassociates the lanes while the link is still "up" and the link width change can happen at any time even if there are requests in flight. All lanes are reassociated with the state machine in the recovery.rcvrcfg state. Therefore, all lanes generate TS1 training sets with link and lane numbers set to PAD. When the state machine passes through the configuration state, the link width is negotiated to determine the value of the link width. The link training gets completed and the link returns to L0 at the new width.

The determination as to whether or not the link width should be changed as noted above can be done in hardware or software and, for example, if performed in hardware other factors to consider may be determining the number of packets being sent or if the link is sending many logical idles that the link width can be reduced. If there are more requests queued and all the link transfer capabilities being used then the link width may be increased.

The link width control register, enables an indication of which link widths are allowed, which prevents the link width changing to link widths that have not been validated on a particular platform. As noted above, the register contents, namely the mask bits are set or programmed after interrogating the components in the system.

It will also be recognized that when lanes need to be added that lanes be reassociated in a state where the link is still "up" and not necessarily just in the configuration state. In addition, it may be desirable not to go back to the detect state and instead not discard TLPs that are in flight when the link is down by simply storing them and awaiting for the link to return to a "up" state and then send the information. This may slightly increase the state sequence that must be carried out but may improve system reliability. Other variations will be recognized by those of ordinary skill in the art.

Alternative variations for reducing link widths may include, but are not limited to, performing the long link width reconfiguration process, but not discarding transactions when the link is in a down state. The transmit data is held in the data path. For example transactions are throttled back and are not discarded to avoid loss of transactions. This is as simple as saying that a) the short configuration sequence is not enabled, and b) that in step 418, the link does not go down in this "long(er)" configuration sequence.

In another embodiment, receivers are prevented from being detected during a detect state. The link is transitioned through a recovery and detect state. The number of active lanes of the differential serial communication link are changed by setting a link width change circuit, such as flop 349, and disabling at least one receiver termination and transitioning the link through a recovery state and a detect state. In one example, receiver terminations are disabled through a switch activated by a suitable control signal so that receiver terminators are disabled on a transition back to the detect state. For example, the switch disconnects receiver termination resistors through a suitable transistor switching array or any other suitable mechanism. A normal training sequence may then be carried out. The link width with receivers that appear to be off will be discovered, and trained normally. Not discarding requests is useful in this case to prevent the system from becoming unstable. It is not necessary though, because a driver could simply prevent accesses to the component, so there would be nothing to discard. In another embodiment, it may be desirable to save power or reduce power by shutting off a transmitter.

As noted above, not only can power consumption be reduced by utilizing the differing power states for active lanes, but the number of lanes may also be reduced thereby further reducing power consumption. When additional bandwidth is needed, reassociating lanes to be controlled by the state machine is performed by directly entering a configuration state and bypassing for example, a detect state. This can save time in getting the additional lanes in a "up" state, and allows the computer system to remain stable.

FIG. 6 illustrates another example of a system in accordance with the invention wherein the dynamic link width control logic 312 is represented as a state machine and training set generator 600 that communicates with logic labeled dynamic link width state transition controller 602. The dashed boxes indicate that the operations may be carried out by differing processors. For example, the logic idle detect circuit may provide an indication to a software driver acting as the link width determinator. However, if the link width determinator is present in the graphics processor then the driver and host processor need not be employed. In any event, as shown in FIG. 6, the previous description described with respect to the various states are carried out the state machine 600 in combination with the dynamic link width state transition controller 602. The dynamic link width state transition controller may be any suitable logic which controls the activation and bypassing, for example, of the states during the dynamic normal operation link width control. The state machine 600 also includes the same states and operation as conventional LTSSMs so that conventional power on and reset operations may also be performed.

As such, among other advantages, a short link width negotiation sequence is carried out and it is not necessary to return back to a detect state. For example, when increasing the number of lanes, it may be desirable as noted above to bypass the detect state thereby speeding up the transition.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method for managing power consumption corresponding to a differential serial communication link having a link width comprised of one or more lanes adapted to communicate clock recovery information in a data stream comprising:
    determining, during conditions other than power on, reset or link fault conditions, desired link width for the serial communication link that communicates clock recovery information in a data stream;
    changing a number of active lanes of the differential serial communication link to change link width, based on the desired link width such that each active lane operates in a normal operational state of the differential serial communication link; and
    wherein changing the number of active lanes includes setting a link width change circuit to transition to a link recovery state and transitioning from the link recovery state to a configuration state without farther transitioning to a detect state.

2. The method of claim 1 wherein changing the number of active lanes includes increasing the link width to re-associate at least one previously disassociated lane.

3. The method of claim 1 including:
    determining allowable link widths ranges of elements on both ends of the differential serial communication link; and
    storing data representing an allowable link width size constraint.

4. The method of claim 1 including, when a change is an increase in link width, reassociating previous disassociated lanes without requiring a transition to a detect state thereby preventing a transmit data buffer from discarding stored data during a process of reassociating disassociated lanes.

5. The method of claim 1 wherein changing is provided by performing a link width negotiation sequence during normal device operation.

6. The method of claim 1 wherein determining the desired link width for the serial communication link is based on at least one of: link inactivity, link activity, whether a battery power condition exists and estimated link bandwidth demand.

7. The method of claim 3 wherein changing the number of active lanes of the differential serial communication link is based on the stored data representing an allowable link width size constraint.

8. The method of claim 1 wherein changing the number of active lanes of the differential serial communication link is based on data representing a desired link width size, and data representing when to change the link width.

9. The method of claim 1 wherein changing the number of active lanes of the differential serial communication link includes setting a link width change circuit and disabling at least one receiver termination and transitioning the link through a recovery state and a detect state.

10. The method of claim 1 wherein the differential serial communication link is compliant with the PCI express specification.

11. An integrated circuit comprising:
    a differential serial communication circuit adapted to at least communicate clock recovery information in a data stream, wherein the differential serial communication circuit can form a link having a link width comprised of one or more lanes;
    dynamic link width control logic, operatively coupled to the differential serial communication circuit for managing power consumption corresponding to differential serial communication circuit, operative to change, during normal operating conditions, a number of active lanes of the differential serial communication link to change link width, based on a determined desired link width such that each active lane operates in a normal operational state of the differential serial communication link;
    a link width command register containing at least data representing a command that causes the dynamic link width control logic to change the link width to a size identified by a link width control register;
    the link width control register containing at least data representing a desired link width size; and
    wherein the dynamic link width control logic includes a state machine and wherein the integrated circuit includes logic operatively coupled to the dynamic link width control logic that is activated to cause the state machine to transition to a configuration state without transitioning to a detect state.

12. The integrated circuit of claim 11 wherein the link width command register includes data representing when to change the link width.

13. The integrated circuit of claim 11 including:
    a link width determination circuit operatively coupled to the dynamic link width control logic and operative to determine, during conditions other than power on, reset or link fault conditions, desired link width for the serial communication link that communicates clock recovery information in a data stream.

14. The integrated circuit of claim 13 wherein the link width determination circuit is operative to write to the link width command register to cause the dynamic link width control logic to begin a process of changing the link width.

15. The integrated circuit of claim 11 wherein the link width control register further contains at least data representing an allowable link width size constraint and that a short link width configuration operation should be used to increase the link width.

16. The integrated circuit of claim 11 wherein the integrated circuit is a memory bridge circuit couplable to a processing device and memory.

17. The integrated circuit of claim 11 wherein the integrated circuit is a graphics processor and includes graphics processing circuitry operatively coupled to communicate data through the differential serial communication circuit.

18. A system comprising:

a first processor;

a second processor that includes:

a first differential serial communication circuit adapted to at least communicate clock recovery information in a data stream, wherein the differential serial communication circuit can form a link having a link width comprised of one or more lanes; and first dynamic link width control logic, operatively coupled to the differential serial communication circuit for managing power consumption corresponding to the first differential serial communication circuit, operative to change, during normal operating conditions, a number of active lanes of the differential serial communication link to change link width, based on a determined desired link width such that each active lane operates in a normal operational state of the differential serial communication link;

memory; and a memory bridge circuit operatively coupled to the first processor through a bus and the memory through another bus, and including a second differential serial communication circuit adapted to at least communicate clock recovery information in a data stream, wherein the second differential serial communication circuit forms the link with the first differential serial communication circuit; and second dynamic link width control logic, operatively coupled to the second differential serial communication circuit for managing power consumption corresponding to the second differential serial communication circuit, operative to change, during normal operating conditions, a number of active lanes of the differential serial communication link to change link width, based on a determined desired link width such that each active lane operates in a normal operational state of the differential serial communication link and wherein the second processor includes logic operatively coupled to the dynamic link width control logic that is activated to cause a state machine to transition to a configuration state without transitioning to a detect state.

19. The system of claim 18 wherein the first processor is operative to determine, during conditions other than power on, reset or link fault conditions, desired link width for the serial communication link that communicates clock recovery information in a data stream.

20. The system of claim 18 wherein each of the second processor and the memory bridge circuit each include:

a link width command register containing at least data representing a command that causes the respective dynamic link width control logic to change the link width to a size identified by a link width control register; and the link width control register containing at least data representing a desired link width size, and data representing when to change the link width.

* * * * *